United States Patent
Hu et al.

(10) Patent No.: US 11,399,375 B2
(45) Date of Patent: Jul. 26, 2022

(54) RESOURCE ALLOCATION METHOD FOR INTERNET OF VEHICLES (IOV) IN HIGH-DENSITY IN-VEHICLE COMMUNICATION ENVIRONMENT

(71) Applicant: South China University of Technology, Guangdong (CN)

(72) Inventors: Bin-jie Hu, Guangdong (CN); Qirui Yan, Guangdong (CN)

(73) Assignee: South China University of Technology, Guangzhou (CN)

(*) Notice: Subject to any disclaimer, the term of this patent is extended or adjusted under 35 U.S.C. 154(b) by 0 days.

(21) Appl. No.: 17/137,345

(22) Filed: Dec. 29, 2020

(65) Prior Publication Data
US 2021/0274505 A1 Sep. 2, 2021

(30) Foreign Application Priority Data
Feb. 27, 2020 (CN) .......................... 202010122741.2

(51) Int. Cl.
H04W 72/08 (2009.01)
H04B 17/336 (2015.01)
(Continued)

(52) U.S. Cl.
CPC ........ *H04W 72/082* (2013.01); *H04B 17/336* (2015.01); *H04W 4/46* (2018.02); *G16Y 10/40* (2020.01); *H04W 84/005* (2013.01)

(58) Field of Classification Search
CPC ..... H04W 72/04; H04W 4/46; H04W 84/005; H04W 72/08; H04W 72/082; H04B 17/336
See application file for complete search history.

(56) References Cited

U.S. PATENT DOCUMENTS 8,155,233 B1 * 4/2012 Lee ....................... H04L 1/0631
375/267
8,520,695 B1 * 8/2013 Rubin .............. G08G 1/096791
370/445
(Continued)

*Primary Examiner* — Jenee Holland
(74) *Attorney, Agent, or Firm* — Neugeboren O'Dowd PC

(57) ABSTRACT

A resource allocation method for IoV in a high-density in-vehicle communication environment. Establishing a channel model in the high-density in-vehicle communication environment, establishing allocation matrix A and reuse matrix $\mathcal{R}$ for resource allocation, and calculating signal-to-noise ratio (SINR) $\gamma_n^v$ at a receive end of a vehicular user equipment (VUE) and SINR $\gamma_m^c$ at a receive end of a cellular user equipment (CUE); constructing a resource allocation model with constraints that $\gamma_m^c$ is less than specified SINR threshold $\gamma_{th}^c$ and $\gamma_n^v$ is less than maximum outage probability threshold $p_o$ and an optimization objective of maximizing the number of VUEs that can successfully communicate in the coverage of the base station; driving and simplifying the constraints in the resource allocation model by using a series theorem; and finally heuristically solving the simplified resource allocation model, determining transmit power of VUEs, and obtaining a resource allocation method.

5 Claims, 4 Drawing Sheets

(51) Int. Cl.
*H04W 4/46* (2018.01)
*G16Y 10/40* (2020.01)
*H04W 84/00* (2009.01)
*H04W 4/40* (2018.01)
*H04W 52/24* (2009.01)
*H04W 52/38* (2009.01)
*H04W 16/02* (2009.01)

(56) References Cited

U.S. PATENT DOCUMENTS

| | | | | |
|---|---|---|---|---|
| 8,705,527 | B1* | 4/2014 | Addepalli | H04W 12/03 |
| | | | | 370/389 |
| 8,902,961 | B1* | 12/2014 | Nabar | H04B 7/0456 |
| | | | | 375/225 |
| 9,001,873 | B2* | 4/2015 | Sarrigeorgidis | H04B 7/0413 |
| | | | | 375/219 |
| 2006/0079221 | A1* | 4/2006 | Grant | H04B 7/0697 |
| | | | | 455/423 |
| 2009/0047971 | A1* | 2/2009 | Fu | H04W 72/082 |
| | | | | 455/450 |
| 2012/0076248 | A1* | 3/2012 | Rosenqvist | H04B 1/712 |
| | | | | 375/346 |
| 2013/0141580 | A1* | 6/2013 | Stein | B60W 40/076 |
| | | | | 348/148 |
| 2014/0099960 | A1* | 4/2014 | Ahmad | H04W 36/30 |
| | | | | 455/438 |
| 2017/0013632 | A1* | 1/2017 | Bercovich | H04W 72/042 |
| 2017/0132853 | A1* | 5/2017 | Matos | G07C 5/008 |
| 2017/0155536 | A1* | 6/2017 | Xu | H04L 27/3405 |
| 2017/0223733 | A1* | 8/2017 | Nakata | H04L 25/0224 |
| 2018/0191546 | A1* | 7/2018 | Azizi | H04W 88/12 |
| 2018/0242190 | A1* | 8/2018 | Khoryaev | H04W 28/0226 |
| 2018/0279259 | A1* | 9/2018 | Gulati | H04L 5/0071 |
| 2018/0316764 | A1* | 11/2018 | Ferreira Gomes | H04W 28/02 |
| 2019/0150157 | A1* | 5/2019 | Panteleev | H04W 72/0486 |
| | | | | 370/329 |
| 2019/0268916 | A1* | 8/2019 | Guo | G06F 16/252 |
| 2019/0327619 | A1* | 10/2019 | Altintas | H04W 4/44 |
| 2020/0128591 | A1* | 4/2020 | Subramanian | H04W 4/44 |
| 2020/0136978 | A1* | 4/2020 | Li | H04L 67/148 |
| 2020/0221423 | A1* | 7/2020 | Wang | H04W 74/0808 |
| 2020/0245115 | A1* | 7/2020 | Dorrance | G01C 21/3893 |
| 2020/0280827 | A1* | 9/2020 | Fechtel | H04W 8/08 |
| 2020/0343981 | A1* | 10/2020 | Garcia | H04B 17/29 |
| 2020/0351057 | A1* | 11/2020 | Yeo | H04L 5/0055 |
| 2020/0351856 | A1* | 11/2020 | Yeo | H04W 4/40 |
| 2020/0367221 | A1* | 11/2020 | Maaref | H04W 72/0406 |
| 2021/0051584 | A1* | 2/2021 | Cheng | H04W 76/28 |
| 2021/0114616 | A1* | 4/2021 | Altman | H04W 36/00837 |
| 2021/0136699 | A1* | 5/2021 | Scholand | H04W 52/34 |
| 2021/0227535 | A1* | 7/2021 | Li | H04W 36/0083 |

\* cited by examiner

RESOURCE ALLOCATION METHOD FOR INTERNET OF VEHICLES (IOV) IN HIGH-DENSITY IN-VEHICLE COMMUNICATION ENVIRONMENT

PRIORITY UNDER 35 U.S.C. § 119

This application claims the priority to Chinese Patent Application No. 202010122741.2, entitled "RESOURCE ALLOCATION METHOD FOR INTERNET OF VEHICLES (IOV) IN HIGH-DENSITY IN-VEHICLE COMMUNICATION ENVIRONMENT," filed with the China National Intellectual Property Administration on Feb. 27, 2020, assigned to the assignee hereof, and expressly incorporated by reference herein in its entirety.

TECHNICAL FIELD

The present disclosure relates to the technical field of Internet of vehicles (IoV) communications, and in particular, to a resource allocation method for IoV in a high-density in-vehicle communication environment.

BACKGROUND

The Internet of vehicles (IoV) is a core part of a future Intelligent Transportation System (ITS). With the help from a new generation of information and communication technologies, the IoV implements in-vehicle, vehicle-to-human, vehicle-to-vehicle, vehicle-to-road, and vehicle-to-service platform data exchange. It aims to improve road safety and traffic efficiency, reduce the impact on the environment, and provide additional infotainment. A core implementation method is vehicle to everything (V2X) communications.

In reality, high vehicle density may lead to huge message flows or short-term traffic surges. How to effectively use and manage limited network capacity and radio resources to reduce interference between users and ensure high-reliability low-latency communication becomes the most important issue in the V2X communication.

Introducing the device to device (D2D) communication technology into cellular networks can improve spectrum efficiency, ease the tightness of spectrum resources in a high-density in-vehicle communication environment, increase throughput, alleviate short-term traffic surges in the high-density in-vehicle communication environment, reduce end-to-end delays, and ensure the advantages of V2X communication such as a low latency requirement, channel gain increase, and multi-hop gain. However, D2D communication reuses spectrum resources of the cellular networks, which may cause interference to cellular users. In the high-density in-vehicle communication environment, resources of one cellular user may be reused by a plurality of vehicle users to ensure vehicle to vehicle (V2V) communication. More vehicle users using resources of the same cellular user cause more severe interference to the cellular user. Therefore, it is of great significance to study a resource allocation method for reusing the resources of the cellular user as much as possible while ensuring that the cellular user is not severely interfered.

SUMMARY

The present disclosure aims to resolve the above-mentioned disadvantage in the prior art and provide a resource allocation method for V2X communications in a high-density in-vehicle communication environment.

The objective of the present disclosure can be realized through the following technical solution:

A resource allocation method for IoV in a high-density in-vehicle communication environment, where in an application scenario of the method, a base station is deployed on one side of a two-way multi-lane road, the coverage radius of the base station is R, and there are N vehicular user equipments (VUE) running at speed V on the road and M cellular user equipments (CUE) evenly distributed outside the road, and the method includes the following steps:

S1. establishing a channel model in the high-density in-vehicle communication environment, establishing allocation matrix A and reuse matrix $\mathcal{R}$ for resource allocation, and calculating signal-to-noise ratio (SINR) $\gamma_n^v$ at a receive end of a VUE and SINR $\gamma_m^c$ at a receive end of a CUE;

S2. constructing a resource allocation model with constraints that $\gamma_m^c$ is less than specified SINR threshold $\gamma_{th}^c$ and $\gamma_n^v$ is less than maximum outage probability threshold $p_o$ and an optimization objective of maximizing the number of VUEs that can successfully communicate in coverage of the base station;

S3. deriving and simplifying the constraints in the resource allocation model by using a series theorem to reduce complexity of solving the resource allocation model; and S4. heuristically solving the simplified resource allocation model, determining transmit power of all VUEs in the coverage of the base station, and obtaining a resource allocation method.

Further, S1 may specifically include:

S11. establishing the channel model in the high-density in-vehicle communication environment, where $g_{i,j}$ denotes a power gain of a channel from transmitter i to receiver j, and its calculation formula is:

$$g_{i,j} = A^* h_{i,j} \beta_{i,j} L_{i,j}^{-\lambda}$$

where $A^*$ denotes a path fading constant, $h_{i,j}$ denotes a small-scale fading coefficient, $\beta_{i,j}$ denotes shadow fading, $L_{i,j}$ denotes a distance from transmitter i to receiver j, and $\lambda$ denotes an attenuation index;

S12. establishing allocation matrix A and reuse matrix $\mathcal{R}$ for resource allocation, where allocation matrix A represents reuse of CUE resources by different VUEs, and its expression is:

$$A = \begin{vmatrix} a_{1,1} & \cdots & a_{1,N} \\ \vdots & & \vdots \\ a_{M,1} & \cdots & a_{M,N} \end{vmatrix}$$

where $a_{m,n}$ indicates whether resources of an mth CUE is reused by an nth VUE; reuse matrix $\mathcal{R}$ indicates whether VUEs reuse resources of the same CUE, and its expression is:

$$\mathcal{R} = \begin{vmatrix} r_{1,1} & \cdots & r_{1,N} \\ \vdots & & \vdots \\ r_{N,1} & \cdots & r_{N,N} \end{vmatrix}$$

where $r_{n',n}$ indicates whether the nth VUE shares a same CUE with an n'th VUE;

S13. calculating SINR $\gamma_n^v$ at the receive end of the VUE by using the following formula:

$$\gamma_n^v = \frac{P_n^v g_n}{\sum_{m=1}^{M} a_{m,n} P_m^c g_{m,B} + \sum_{\substack{n'=1 \\ n' \neq n}}^{N} r_{n',n} P_{n'}^v g_{n',n} + \sigma^2}$$

where $g_n$ denotes a power gain of a channel from a transmit end to the receive end of the nth VUE, $P_n^v$ denotes transmit power of the n'th VUE, and $g_{n',n}$ denotes a power gain of a channel between the nth VUE and the n'th VUE.

S14. calculating SINR $\gamma_m^c$ at the receive end of the CUE by using the following formula:

$$\gamma_m^c = \frac{P_m^c g_{m,B}}{\sum_{n=1}^{N} a_{m,n} P_n^v g_{n,B} + \sigma^2}$$

where $P_m^c$ denotes transmit power of the mth CUE, $g_{m,B}$ denotes a power gain of a channel from the mth CUE to the base station, $P_n^v$ denotes transmit power of the nth VUE, $g_{n,B}$ denotes a power gain of a channel from the nth VUE to the base station, and $\sigma^2$ denotes power spectral density of additive white Gaussian noise.

Further, the resource allocation model with the constraints that $\gamma_m^c$ is less than specified SINR threshold $\gamma_{th}^c$ and $\gamma_n^v$ is less than maximum outage probability threshold $p_o$ and the optimization objective of maximizing the number of VUEs that can successfully communicate in the coverage of the base station in S2 is as follows:

$$P1: \max \sum_{n=1}^{N} U_n$$

$$C1: U_n = \begin{cases} 1, & \sum_{m=1}^{M} a_{m,n} > 0 \\ 0, & \sum_{m=1}^{M} a_{m,n} = 0 \end{cases}$$

$$C2: \sum_{m=1}^{M} a_{m,n} \leq 1$$

$$C3: \gamma_m^c \geq \gamma_{th}^c$$

$$C4: Pr\{\gamma_n^v \leq \gamma_{th}^c\} \leq p_o$$

$$C5: P_m^c \leq P_{max}^c$$

$$C6: P_n^v \leq P_{max}^v$$

where P1 is the optimization objective, C1, C2, C3, C4, C5, and C6 are constraints, $U_n$ indicates whether the nth VUE reuses resources of any CUE in the coverage of the base station, $\gamma_{th}^c$ denotes a specified SINR threshold of the CUE, $\gamma_{th}^v$ denotes a specified SINR threshold of the VUE, $p_o$ denotes a maximum outage probability threshold of the VUE, and $P_{max}^c$ and $P_{max}^v$ denote maximum transmit power of transmitters in the CUE and the VUE respectively.

Further, the deriving and simplifying constraints C3 and C4 in the resource allocation model established in S2 by using the series theorem to reduce the solving complexity in S3 may include:

S31. initialing transmit power $P_m^c$ of the CUE to $P_{max}^c$;

S32. substituting the determined $P_m^c$ into C3, where the obtained expression is:

$$\frac{\frac{P_m^c g_{m,B}}{\gamma_{th}^c} - \sigma^2 - \sum_{\substack{n'=1 \\ n \neq n'}}^{N} a_{m,n'} P_{n'}^v g_{n',B}}{g_{n,B}} \geq P_n^v$$

S33. simplifying C4 by using the series theorem, where the obtained expression is:

$$\frac{P_n^v g_n}{P_m^c g_{m,n} + \sigma^2 + \sum_{\substack{n'=1 \\ n \neq n'}}^{N} r_{n',n} P_{n'}^v g_{n',n}} \geq \frac{\gamma_{th}^v}{\ln\left(\frac{1}{1-p_o}\right)}$$

S34. obtaining a value range of $P_n^v$ based on the expressions in S33 and S34, where $P_{n\_min}^v$ denotes a lower bound of the value range of $P_n^v$, $P_{n\_max}^v$ denotes an upper bound of the value range of $P_n^v$, and they are calculated by using the following formulas:

$$P_{n\_min}^v = \frac{\frac{\gamma_{th}^v}{\ln\left(\frac{1}{1-p_o}\right)} \times \left(P_m^c g_{m,n} + \sigma^2 + \sum_{\substack{n'=1 \\ n \neq n'}}^{N} r_{n',n} P_{n'}^v g_{n',n}\right)}{g_n}$$

$$P_{n\_max}^v = \min\left(\frac{\frac{P_m^c g_{m,B}}{\gamma_{th}^v} - \sigma^2 - \sum_{\substack{n'=1 \\ n \neq n'}}^{N} a_{m,n'} P_{n'}^v g_{n',B}}{g_{n,B}}, P_{max}^v\right);$$

S35. transforming constraints C3, C4, C5, and C6 in the resource allocation model established in S2 into a constraint on the value range of $P_n^v$ based on a result of S34 to obtain the following optimized resource allocation model:

$$P1: \max \sum_{n=1}^{N} U_n$$

$$C1: U_n = \begin{cases} 1, & \sum_{m=1}^{M} a_{m,n} > 0 \\ 0, & \sum_{m=1}^{M} a_{m,n} = 0 \end{cases}$$

$$C2: \sum_{m=1}^{M} a_{m,n} \leq 1$$

$$C3: P_{n\_min}^v \leq P_n^v \leq P_{n\_max}^v, 1 \leq n \leq N.$$

Further, the determining transmit power and resource allocation methods for VUEs in the coverage of the base station in S4 specifically includes:

S41. calculating value range $[P_{n\_min}^v, P_{n\_max}^v]$ of $P_n^v$ when a VUE reuses resources of each CUE in the coverage of the base station;

S42. if it is obtained from S41 that $P_{n\_min}^v$ is less than $P_{n\_max}^v$, determining that the VUE can reuse uplink resources of a current CUE; otherwise, determining that the VUE cannot reuse resources of the current CUE;

S43. if it is determined in S42 that the VUE can reuse the resources of the current CUE, setting transmit power $P_n^v$ of the VUE to $P_{n\_max}^v$ calculated in S41, updating allocation matrix A and reuse matrix $\mathcal{R}$, and ending calculation for the current VUE; otherwise, continuing to traverse a next CUE until it is determined that resources of all CUEs in the coverage of the base station cannot be reused; and S44. repeating S41, S42, and S43 for all VUEs to obtain transmit power of all VUEs in the coverage of the base station and the resource allocation methods.

Compared with the prior art, the present disclosure has the following advantages and effects:

(1) The method is suitable for the high-density in-vehicle communication environment in which the number of VUEs is far greater than the number of CUEs in the coverage are of a base station. The practical advantage will continue to increase as the number of vehicles on roads continues to increase with time.

(2) An optimization objective of a resource allocation model is to maximize the number of VUEs that can successfully communicate in a cell. This improves fairness of resource allocation for VUEs in a cellular environment, and ensures reliability of V2V communication.

(3) Compared with a random resource allocation method, the resource allocation method provided in the present disclosure can be used to allocate resources to more VUEs when the number of VUEs and the number of CUEs are consistent in the coverage of the same base station. In addition, when the number of VUEs in the coverage of the base station is increasing, the number of VUEs to which resources are successfully allocated by using the resource allocation method provided in the present disclosure is still greater than the number of VUEs to which resources are successfully allocated by using the random resource allocation method. Therefore, the resource allocation method provided in the present disclosure has good performance and stability.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

To make the objective, technical solutions and advantages of embodiments of the present disclosure clearer, the following clearly and completely describes the technical solutions in the embodiments of the present disclosure with reference to accompanying drawings in the embodiments of the present disclosure. The described embodiments only represent some, not all, embodiments of the present disclosure. Other embodiments that can be derived by a person of ordinary skill in the art based on the embodiments of the present disclosure without undue experimentation shall fall within the protection scope of the present disclosure.

Figure 1:
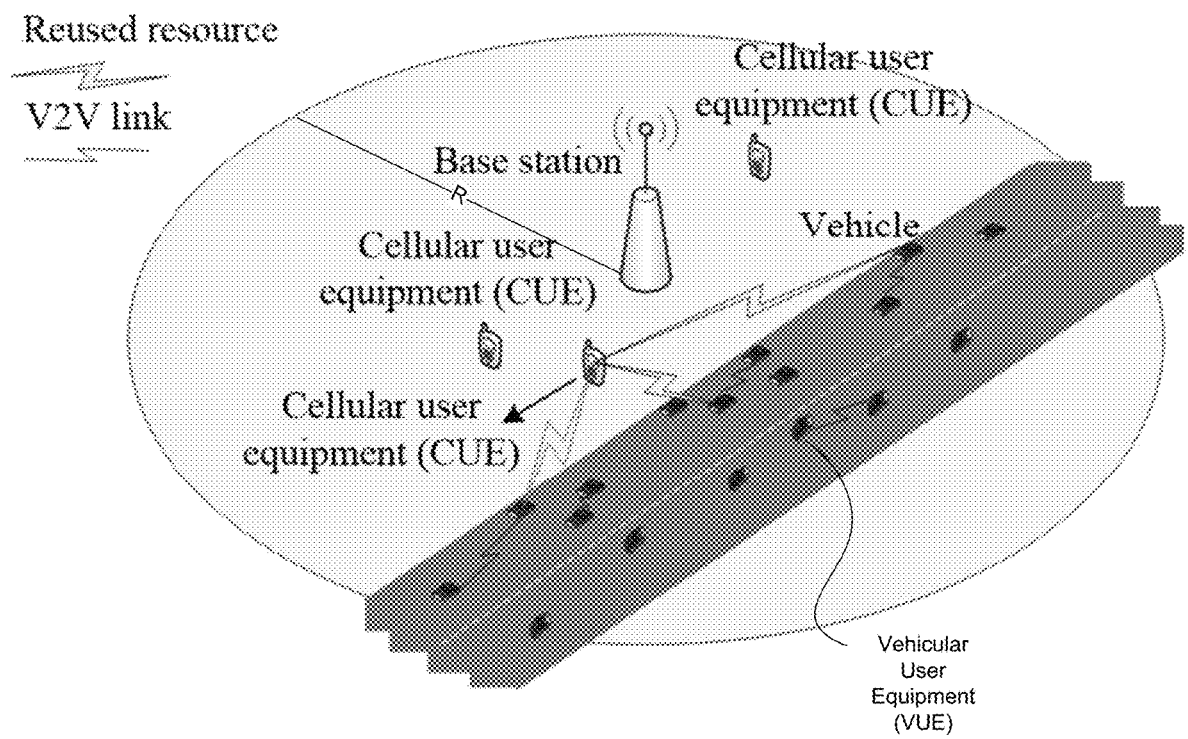
FIG. 1 is a schematic diagram of a physical cell model on which a resource allocation method disclosed in the present disclosure is based.

A first embodiment is as follows:

As shown in FIG. 1, in an application scenario, a base station is deployed on one side of a two-way multi-lane road. The coverage radius of the base station is R. There are N vehicular user equipments (VUE) running at speed V on the road and M cellular user equipments (CUE) evenly distributed outside the road in the coverage of the base station. The VUE includes two vehicles: a transmit end and a receive end.

Figure 2:
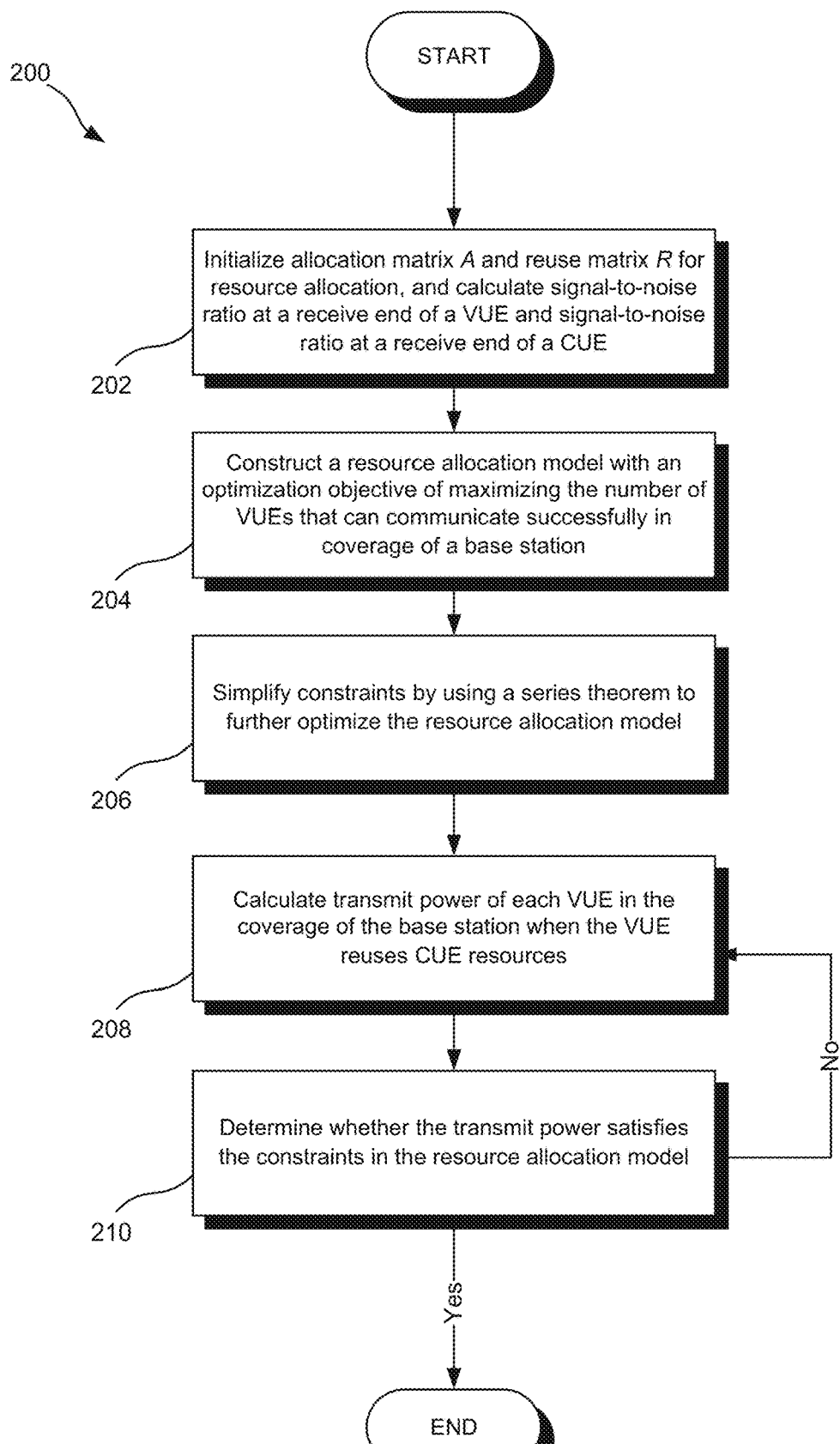
FIG. 2 is a flow chart of a resource allocation method for IoV in a high-density in-vehicle communication environment disclosed in the present disclosure.

FIG. 2 is a flow chart of a resource allocation method for IoV in a high-density in-vehicle communication environment. The method includes the following steps:

S1. Establish a channel model in the high-density in-vehicle communication environment, establish allocation matrix A and reuse matrix $\mathcal{R}$ for resource allocation, and calculate signal-to-noise ratio (SINR) $\gamma_n^v$ at a receive end of a VUE and SINR $\gamma_m^c$ at a receive end of a CUE.

S1 may include:

(1) Establish the channel model in the high-density in-vehicle communication environment.

$g_{i,j}$ denotes a power gain of a channel from transmitter i to receiver j, and its calculation formula is:

$$g_{i,j} = A^* h_{i,j} \beta_{i,j} L_{i,j}^{-\lambda}$$

In the formula, $A^*$ denotes a path fading constant; $h_{i,j}$ denotes a small-scale fading coefficient, which is an independent complex exponential distribution with a mean value of 1, simulated by Rayleigh fading; $\beta_{i,j}$ denotes shadow fading obeying lognormal distribution $\xi$ with standard deviation; $L_{i,j}$ denotes a distance from transmitter i to receiver j; and $\lambda$ denotes an attenuation index.

(2) Establish allocation matrix A and reuse matrix $\mathcal{R}$ for resource allocation.

Allocation matrix A represents reuse of CUE resources by different VUEs, and its expression is:

$$A = \begin{vmatrix} a_{1,1} & \cdots & a_{1,N} \\ \vdots & & \vdots \\ a_{M,1} & \cdots & a_{M,N} \end{vmatrix}$$

In the expression, $a_{m,n}$ indicates whether resources of an mth CUE is reused by an nth VUE. If the resources of the mth CUE are reused by the nth VUE, $a_{m,n}=1$; otherwise, $a_{m,n}=0$.

Reuse matrix $\mathcal{R}$ indicates whether VUEs reuse resources of the same CUE, and its expression is:

$$\mathcal{R} = \begin{vmatrix} r_{1,1} & \cdots & r_{1,N} \\ \vdots & & \vdots \\ r_{N,1} & \cdots & r_{N,N} \end{vmatrix}$$

In the expression, $r_{n',n}$ indicates whether the nth VUE shares a same CUE with an n'th VUE. If the nth VUE shares the same CUE with the n'th VUE, $r_{n',n}=1$; otherwise, $r_{n',n}=0$. Elements in matrices A and $\mathcal{R}$ are all 0 during initialization.

(3) Calculate SINR $\gamma_n^v$ at the receive end of the VUE.

If a VUE reuses uplink resources of a CUE, the VUE may be affected by 1) interference caused by the base station, 2) interference caused by the CUE whose resources are reused, and 3) interference caused by a transmit end of another VUE that reuses resources of the same CUE. SINR $\gamma_n^v$ may be calculated by using the following formula:

$$\gamma_n^v = \frac{P_n^v g_n}{\sum_{m=1}^{M} a_{m,n} P_m^c g_{m,B} + \sum_{\substack{n'=1 \\ n' \neq n}}^{N} r_{n',n} P_{n'}^v g_{n',n} + \sigma^2}$$

In the formula, $g_n$ denotes a power gain of a channel from a transmit end to the receive end of the nth VUE, $P_n^v$ denotes transmit power of the n'th VUE, and $g_{n',n}$ denotes a power gain of a channel between the nth VUE and the n'th VUE.

(4) Calculate SINR $\gamma_m^c$ at the receive end of the CUE.

If resources of a CUE are reused by a VUE, the CUE may be affected by 1) interference caused by the base station, and 2) interference caused by the transmit end of the VUE that reuses the resources of the CUE. SINR $\gamma_m^c$ may be calculated by using the following formula:

$$\gamma_m^c = \frac{P_m^c g_{m,B}}{\sum_{n=1}^{N} a_{m,n} P_n^v g_{n,B} + \sigma^2}$$

In the formula, $P_m^c$ denotes transmit power of the mth CUE, $g_{m,B}$ denotes a power gain of a channel from the mth CUE to the base station, $P_n^v$ denotes transmit power of the nth VUE, $g_{n,B}$ denotes a power gain of a channel from the nth VUE to the base station, and $\sigma^2$ denotes power spectral density of additive white Gaussian noise.

S2. Construct a resource allocation model.

Communication quality of CUEs and VUEs in the coverage of the base station may be ensured by limiting $\gamma_m^c$ of each CUE to be less than a specified SINR threshold $\gamma_{th}^c$ and $\gamma_n^v$ of each VUE to be less than a maximum outage probability threshold $p_o$. An optimization objective of the resource allocation model is to maximize a number of VUEs that can successfully communicate in a cell. This may improve fairness of resource allocation to VUEs in a cellular environment, and ensure reliability of V2V communication. The established resource allocation model may be as follows:

$$P1: \max \sum_{n=1}^{N} U_n$$

$$C1: U_n = \begin{cases} 1, & \sum_{m=1}^{M} a_{m,n} > 0 \\ 0, & \sum_{m=1}^{M} a_{m,n} = 0 \end{cases}$$

$$C2: \sum_{m=1}^{M} a_{m,n} \leq 1$$

$$C3: \gamma_m^c \geq \gamma_{th}^c$$

$$C4: Pr\{\gamma_n^v \leq \gamma_{th}^c\} \leq p_o$$

$$C5: P_m^c \leq P_{max}^c$$

$$C6: P_n^v \leq P_{max}^v$$

$U_n$ indicates whether the nth VUE reuses resources of any CUE in the coverage of the base station. If the nth VUE can reuse the resources of any CUE in the coverage of the base station, $U_n=1$; if resources of all CUEs in the coverage of the base station cannot be reused by the nth VUE, $U_n=0$. $\gamma_{th}^c$ denotes a specified SINR threshold of the CUE. $\gamma_{th}^v$ denotes a specified SINR threshold of the VUE. $p_o$ denotes a maximum outage probability threshold of the VUE. $P_{max}^c$ and $P_{max}^v$ denote maximum transmit power of transmitters in the CUE and the VUE respectively.

In the resource allocation model, P1 is the optimization objective, which physically means the total number of VUEs that can successfully communicate in the coverage of the base station. C1, C2, C3, C4, C5, and C6 are all constraints. C2 physically means that the same VUE can reuse resources of only one CUE. C3 and C4 limit $\gamma_m^c$ of the CUE to be less than $\gamma_{th}^c$ and the communication outage probability of the VUE to be less than $p_o$ to ensure the communication quality of the CUE and the VUE. C5 and C6 limit the maximum transmit power of the transmitters in the CUE and the VUE.

S3. Derive and simplify the constraints by using a series theorem to reduce the complexity of solving the resource allocation model.

The resource allocation model is a non-deterministic polynomial (NP) hard problem. Therefore, it is extremely difficult to obtain the optimal solution. In this embodiment, the optimization problem may be heuristically solved by constructing a power allocation rule for VUEs, using the series theorem to derive and simplify constraints C3 and C4 in the resource allocation model established in S2, and further optimizing the resource allocation model established in S2.

S3 may specifically include:

(1) Initializing transmit power $P_m^c$ of the CUE to $P_{max}^c$.

In an actual environment, a time period in which the CUE is in the coverage of the base station may be longer than a time period in which the VUE is in the coverage of the base station. Therefore, transmit power $P_m^c$ of the CUE is initialized to $P_{max}^c$ to simplify the model in the present disclosure.

(2) Use the series theorem to simplify the constraints.

Substitute the determined $P_m^c$ into C3 of the resource allocation model in S2, and move the determined value to the left, where the obtained expression is:

$$\frac{\frac{P_m^c g_{m,B}}{\gamma_{th}^c} - \sigma^2 - \sum_{\substack{n'=1 \\ n \neq n'}}^{N} a_{m,n'} P_{n'}^v g_{n',B}}{g_{n,B}} \geq P_n^v$$

Use the series theorem to simplify C4 of the resource allocation model in S2, where the obtained expression is:

$$\frac{P_n^v g_n}{P_m^c g_{m,n} + \sigma^2 + \sum_{\substack{n'=1 \\ n \neq n'}}^{N} r_{n',n} P_{n'}^v g_{n',n}} \geq \frac{\gamma_{th}^v}{\ln\left(\frac{1}{1-p_o}\right)}$$

The series theorem is:

$$Pr\left\{z_1 \leq \sum_{i=2}^{n} z_i + c\right\} = 1 - e^{\lambda_1 c} \prod_{i=2}^{n} \frac{1}{1 + \frac{\lambda_1}{\lambda_i}}$$

$z_1, \ldots, z_n$ are mutually independent random variables that obey exponential distribution, $\lambda_i$ denotes the reciprocal of the mean of an ith random variable $z_i$, and c is a constant.

(3) Calculate a value range of $P_n^v$.

Upper bound $P_{n\_max}^v$ and lower bound $P_{n\_min}^v$ of the value range of $P_n^v$ can be obtained through the above simplification, where the calculation formulas are:

$$P_{n\_min}^v = \frac{\dfrac{\gamma_{th}^v}{\ln\left(\dfrac{1}{1-p_o}\right)} \times \left(P_m^c g_{m,n} + \sigma^2 + \Sigma_{\substack{n'=1 \\ n \neq n'}}^{N} r_{n',n} P_{n'}^v g_{n',n}\right)}{g_n}$$

$$P_{n\_max}^v = \min\left(\frac{\dfrac{P_m^c g_{m,B}}{\gamma_{th}^c} - \sigma^2 - \Sigma_{\substack{n'=1 \\ n \neq n'}}^{N} a_{m,n'} P_{n'}^v g_{n',B}}{g_{n,B}}, P_{max}^v\right)$$

(4) Optimize the resource allocation model established in S2.

Constraints C3, C4, C5, and C6 of the resource allocation model established in S2 may be transformed into a constraint on the value range of $P_n^v$. The optimized resource allocation model may be:

$$P1: \max \sum_{n=1}^{N} U_n$$

$$C1: U_n = \begin{cases} 1, \sum_{m=1}^{M} a_{m,n} > 0 \\ 0, \sum_{m=1}^{M} a_{m,n} = 0 \end{cases}$$

$$C2: \sum_{m=1}^{M} a_{m,n} \leq 1$$

$$C3: P_{n\_min}^v \leq P_n^v \leq P_{n\_max}^v, 1 \leq n \leq N$$

In the optimization model, P1 is the optimization objective, which physically means the number of VUEs that can successfully communicate in a cell. C1, C2, and C3 are all constraints. C2 physically means that the same VUE can reuse resources of only one CUE. C3 ensures communication quality of CUEs and VUEs by limiting transmit power $P_n^v$ of the VUEs. In this way, the NP hard problem is simplified and solved.

S4. Heuristically solve the simplified resource allocation model, determine transmit power of all VUEs in the coverage of the base station, and obtain a resource allocation method.

S4 may specifically include:

(1) Calculating a value range $[P_{n\_min}^v, P_{n\_max}^v]$ of $P_n^v$ when a VUE reuses resources of each CUE in the coverage of the base station.

(2) If it is determined in S41 that $P_{n\_min}^v$ is less than $P_{n\_max}^v$, determine that the VUE can reuse uplink resources of a current CUE; otherwise, determine that the VUE cannot reuse resources of the current CUE.

(3) If it is determined that the VUE can reuse the resources of the current CUE, set transmit power $P_n^v$ of the VUE to the calculated $P_{n\_max}^v$, update allocation matrix A and reuse matrix $\mathcal{R}$, and end CUE traversal for the current VUE; otherwise, continue to traverse a next CUE until it is determined that resources of all CUEs in the coverage of the base station cannot be reused.

(4) Perform the traversal and power calculation for all VUEs in the coverage of the base station to obtain a resource allocation method for all VUEs, where the traversal is performed by a natural sequence of unique numbers of the CUEs or VUEs.

In this embodiment, the number of VUEs that successfully communicate is selected as a primary measurement index in a performance simulation experiment. Table 1 lists main parameters for the simulation experiment.

TABLE 1

Main parameters for the simulation experiment

| Main parameters | Configuration value |
| --- | --- |
| Physical cell radius | 500 m |
| Distance from base station to road | 35 m |
| Carrier frequency | 5.9 GHz |
| Moving speed of VUE | 70 km/h |
| Maximum transmit power of CUE | 23 dBm |
| Maximum transmit power of VUE | 17 dBm |
| SINR threshold of CUE | −10 dB |
| SINR threshold of VUE | 5 dB |
| Maximum outage probability threshold of VUE | 0.01 |

Figure 3:
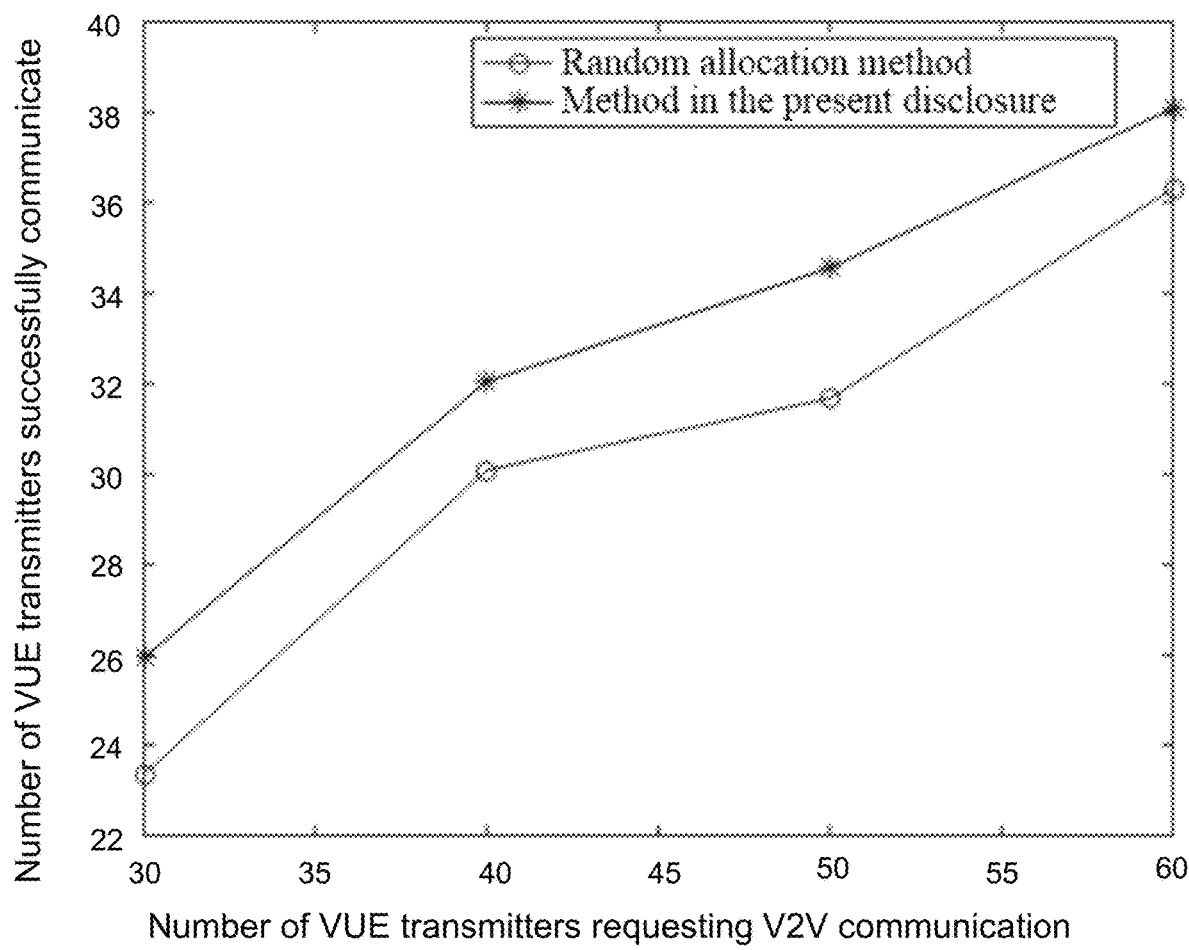
FIG. 3 is a diagram of comparison between a simulation result of a resource allocation method for IoV disclosed in the present disclosure and a simulation result of a random allocation method.

FIG. 3 shows a simulation result of a relationship between the number of VUEs that reuse communication resources of CUEs and communicate successfully and the total number of VUEs in the coverage of the base station, and comparison between a result of the resource allocation method provided in this embodiment and a result of a random resource allocation method in the same simulation environment. Considering that there are few resource allocation methods similar to the resource allocation method in the high-density in-vehicle communication environment provided in this embodiment, the method provided in this embodiment is compared only with the random resource allocation method. It can be seen from the numerical values that, in the coverage of the same base station with the same number of VUEs, the number of VUEs to which resources are successfully allocated by using the resource allocation method provided in this embodiment is significantly greater than the number of VUEs to which resources are successfully allocated by using the random allocation method. In addition, as the total number of VUEs in the coverage of the base station continuously increases, that is, the number of VUEs in a cell is increasing compared with the number of CUEs, the number of VUEs to which resources are successfully allocated by using the resource allocation method provided in this embodiment is still greater than the number of VUEs to which resources are successfully allocated by using the random resource allocation method. Therefore, the resource allocation method provided in this embodiment has advantageous performance.

The above embodiments are preferred embodiment of the present disclosure. However, the embodiments of the present disclosure are not limited by the above embodiments. Any change, modification, substitution, combination, simplification, and the like made without departing from the spiritual essence and principle of the present disclosure should be an equivalent replacement manner, and all are included in the proposed scope of the present disclosure.

Figure 4:
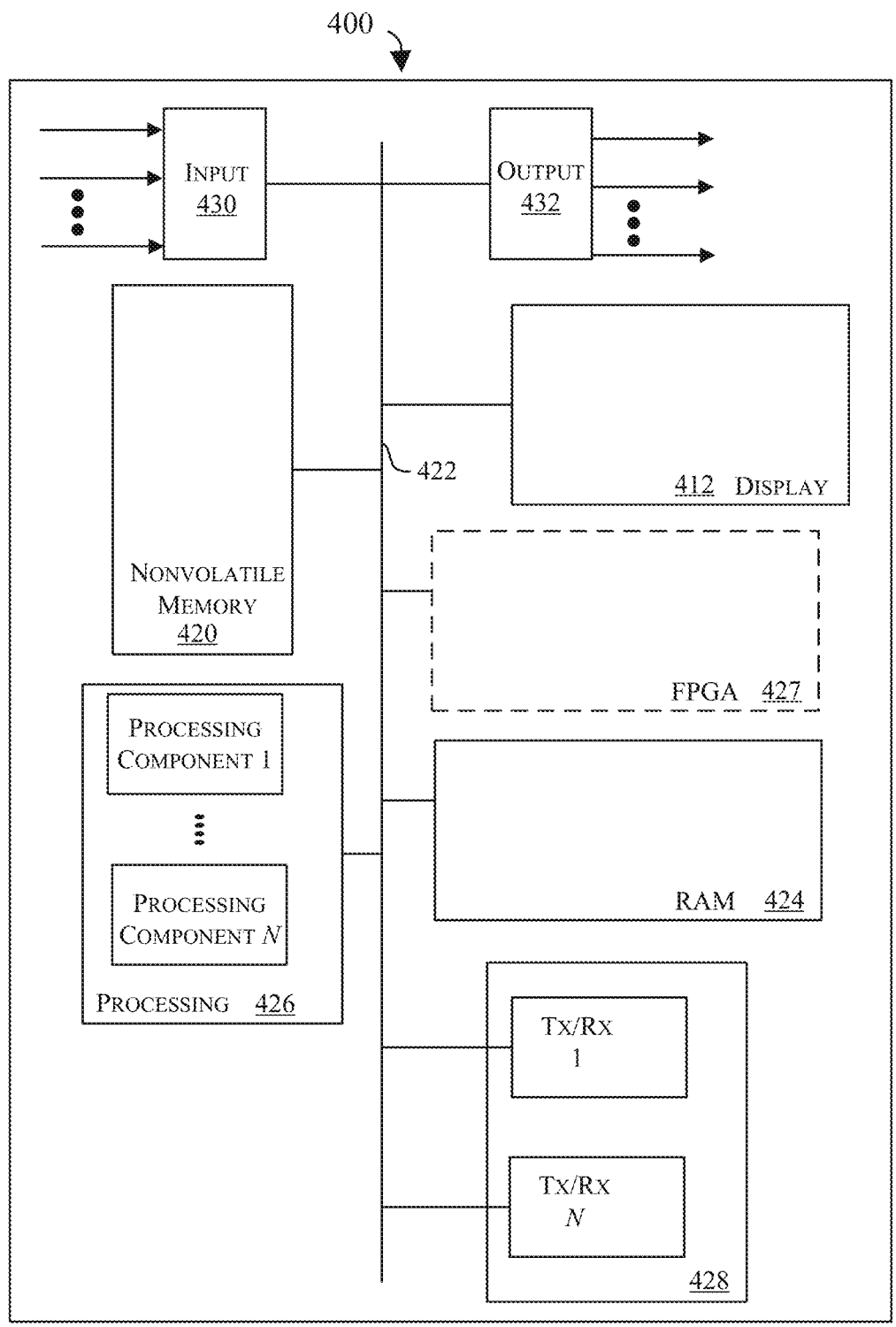
FIG. 4 is a block diagram depicting physical components that may be utilized to realize a system for obtaining a resource allocation method and using the resource allocation method relative to a plurality of CUEs and VUEs according to an exemplary embodiment.

The methods described in connection with the embodiments disclosed herein may be embodied directly in hardware, in processor-executable code encoded in a non-transitory tangible processor readable storage medium, or in a combination of the two. Referring to FIG. 4 for example, shown is a block diagram depicting physical components that may be utilized to realize a system for obtaining a resource allocation method and using the resource allocation method relative to a plurality of CUEs and VUEs according to an exemplary embodiment. As shown, in this embodiment a display portion 412 and nonvolatile memory 420 are coupled to a bus 422 that is also coupled to random access memory ("RAM") 424, a processing portion (which includes N processing components) 426, an optional field programmable gate array (FPGA) 427, and a transceiver component 428 that includes N transceivers. Although the components depicted in FIG. 4 represent physical components, FIG. 4 is not intended to be a detailed hardware diagram; thus many of the components depicted in FIG. 4 may be realized by common constructs or distributed among additional physical components. Moreover, it is contemplated that other existing and yet-to-be developed physical components and architectures may be utilized to implement the functional components described with reference to FIG. 4.

This display portion 412 generally operates to provide a user interface for a user, and in several implementations, the display is realized by a touchscreen display. In general, the nonvolatile memory 420 is non-transitory memory that functions to store (e.g., persistently store) data and processor-executable code (including executable code that is associated with effectuating the methods described herein). In some embodiments for example, the nonvolatile memory 420 includes bootloader code, operating system code, file system code, and non-transitory processor-executable code to facilitate the execution of a method described with reference to FIG. 2 described further herein.

In many implementations, the nonvolatile memory 420 is realized by flash memory (e.g., NAND or ONENAND memory), but it is contemplated that other memory types may be utilized as well. Although it may be possible to execute the code from the nonvolatile memory 420, the executable code in the nonvolatile memory is typically loaded into RAM 424 and executed by one or more of the N processing components in the processing portion 426.

The N processing components in connection with RAM 424 generally operate to execute the instructions stored in nonvolatile memory 420 to enable a method for obtaining a resource allocation method. For example, non-transitory, processor-executable code to effectuate the methods described with reference to FIG. 2 may be persistently stored in nonvolatile memory 420 and executed by the N processing components in connection with RAM 424. As one of ordinarily skill in the art will appreciate, the processing portion 426 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 426 may be configured to effectuate one or more aspects of the methodologies described herein (e.g., the method described with reference to FIG. 2). For example, non-transitory processor-readable instructions may be stored in the nonvolatile memory 420 or in RAM 424 and when executed on the processing portion 426, cause the processing portion 426 to perform a method for obtaining a resource allocation method. Alternatively, non-transitory FPGA-configuration-instructions may be persistently stored in non-volatile memory 420 and accessed by the processing portion 426 (e.g., during boot up) to configure the hardware-configurable portions of the processing portion 426 to effectuate the functions of a system for obtaining a resource allocation method.

The input component 430 operates to receive signals (e.g., base station signal strength) that are indicative of one or more aspects of the base station environment. The signals received at the input component may include, for example, a base station signal strength detected at one or more of the CUEs and/or VUEs. The output component generally operates to provide one or more analog or digital signals to effectuate an operational aspect of the the method for obtaining a resource allocation method. For example, the output portion 432 may provide instructions for allocating CUE and VUE resources.

The depicted transceiver component 428 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The terms and expressions employed herein are used as terms and expressions of description and not of limitation, and there is no intention, in the use of such terms and expressions, of excluding any equivalents of the features shown and described or portions thereof. Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A resource allocation method for Internet of Vehicles (IoV) in a high-density in-vehicle communication environment, wherein in an application scenario of the method, a base station is deployed on one side of a two-way multi-lane road, a coverage radius of the base station is R, and there are N vehicular user equipments (VUE) running at speed V on the two-way multi-lane road and M cellular user equipments (CUE) evenly distributed outside the two-way multi-lane road, and the method comprises the following steps:

S1. establishing a channel model in the high-density in-vehicle communication environment, establishing allocation matrix A and reuse matrix $\mathcal{R}$ for resource allocation, and calculating signal-to-noise ratio (SINR) $\gamma_n^v$ at a receive end of each VUE and SINR $\gamma_m^c$ at a receive end of each CUE;

S2. constructing a resource allocation model with constraints that $\gamma_m^c$ is less than a specified SINR threshold $\gamma_{th}^c$ and $\gamma_n^v$ is less than a maximum outage probability threshold $p_o$ and an optimization objective of maximizing a number of the VUEs that can successfully communicate in the coverage radius of the base station;

S3. deriving and simplifying the constraints in the resource allocation model by using a series theorem to reduce a complexity of solving the resource allocation model; and S4. heuristically solving the simplified resource allocation model, determining a transmit power of those of the VUEs in the coverage radius of the base station, and obtaining a resource allocation method.

2. The resource allocation method for IoV in a high-density in-vehicle communication environment according to claim 1, wherein S1 comprises:

S11. establishing the channel model in the high-density in-vehicle communication environment, wherein $g_{i,j}$ denotes a power gain of a channel from transmitter i to receiver j, and a calculation formula for $g_{i,j}$ is:

$$g_{i,j} = A^* h_{i,j} \beta_{i,j} L_{i,j}^{-\lambda}$$

wherein A* denotes a path fading constant, $h_{i,j}$ denotes a small-scale fading coefficient, $\beta_{i,j}$ denotes shadow fading, $L_{i,j}$ denotes a distance from transmitter i to receiver j, and $\lambda$ denotes an attenuation index;

S12. establishing allocation matrix A and reuse matrix $\mathcal{R}$ for resource allocation, wherein allocation matrix A represents reuse of CUE resources by different ones of the VUEs, and an expression for A is:

$$A = \begin{vmatrix} a_{1,1} & \cdots & a_{1,N} \\ \vdots & & \vdots \\ a_{M,1} & \cdots & a_{M,N} \end{vmatrix}$$

wherein $a_{m,n}$ indicates whether resources of an $m^{th}$ CUE is reused by an $n^{th}$ one of the VUEs, if the resources of the $m^{th}$ CUE are reused by the $n^{th}$ VUE, then $a_{m,n}=1$, otherwise, $a_{m,n}=0$;

reuse matrix $\mathcal{R}$ indicates whether ones of the VUEs reuse resources of a same CUE, and an expression for the matrix $\mathcal{R}$ is:

$$\mathcal{R} = \begin{vmatrix} r_{1,1} & \cdots & r_{1,N} \\ \vdots & & \vdots \\ r_{N,1} & \cdots & r_{N,N} \end{vmatrix}$$

wherein $r_{n',n}$ indicates whether the $n^{th}$ one of the VUEs shares a same CUE with an $n'^{th}$ one of the VUEs;

S13. calculating SINR $\gamma_n^v$ at the receive end of any one of the VUEs by using the following formula:

$$\gamma_n^v = \frac{P_n^v g_n}{\sum_{m=1}^{M} a_{m,n} P_m^c g_{m,B} + \sum_{\substack{n'=1 \\ n \neq n'}}^{N} r_{n',n} P_{n'}^v g_{n',n} + \sigma^2}$$

wherein $g_n$ denotes a power gain of a channel from a transmit end to the receive end of the $n^{th}$ one of the VUEs, $P_{n'}^v$ denotes transmit power of the $n'^{th}$ one of the VUEs, and $g_{n',n}$ denotes a power gain of a channel between the $n^{th}$ VUE and the $n'^{th}$ one of the VUEs; and S14. calculating SINR $\gamma_m^c$ at the receive end of any one of the CUEs by using the following formula:

$$\gamma_m^c = \frac{P_m^c g_{m,B}}{\sum_{n=1}^{N} a_{m,n} P_n^v g_{n,B} + \sigma^2}$$

wherein $P_m^c$ denotes transmit power of the $m^{th}$ CUE, $g_{m,B}$ denotes a power gain of a channel from the $m^{th}$ CUE to the base station, $P_n^v$ denotes transmit power of the $n^{th}$ one of the VUEs, $g_{n,B}$ denotes a power gain of a channel from the $n^{th}$ one of the VUEs to the base station, and $\sigma^2$ denotes power spectral density of additive white Gaussian noise.

3. The resource allocation method for IoV in a high-density in-vehicle communication environment according to claim 1, wherein the resource allocation model with the constraints that $\gamma_m^c$ is less than specified SINR threshold $\gamma_{th}^c$ and $\gamma_n^v$ is less than a maximum outage probability threshold $p_o$ and the optimization objective of maximizing a number of VUEs that can successfully communicate in the coverage radius of the base station in S2 is as follows:

$$P1: \max \sum_{n=1}^{N} U_n$$

$$C1: U_n = \begin{cases} 1, \sum_{m=1}^{M} a_{m,n} > 0 \\ 0, \sum_{m=1}^{M} a_{m,n} = 0 \end{cases}$$

$$C2: \sum_{m=1}^{M} a_{m,n} \leq 1$$

$$C3: \gamma_m^c \geq \gamma_{th}^c$$

$$C4: Pr\{\gamma_n^v \leq \gamma_{th}^v\} \leq p_o$$

$$C5: P_m^c \leq P_{max}^c$$

$$C6: P_n^v \leq P_{max}^v$$

wherein P1 is the optimization objective, C1, C2, C3, C4, C5, and C6 are constraints, $U_n$ indicates whether the $n^{th}$ one of the VUEs reuses resources of any CUE in the coverage radius of the base station, $\gamma_{th}^c$ denotes a specified SINR threshold of the CUE, $\gamma_{th}^v$ denotes a specified SINR threshold of the one of the VUEs, $p_o$ denotes a maximum outage probability threshold of the one of the VUEs, and $P_{max}^c$ and $P_{max}^v$ denote maximum transmit power of transmitters in the CUE and the one of the VUEs, respectively.

4. The resource allocation method for IoV in a high-density in-vehicle communication environment according to claim 3, wherein the deriving and simplifying constraints C3 and C4 in the resource allocation model established in S2 by using the series theorem to reduce the solving complexity in S3 comprises:

S31. initializing transmit power $P_m^c$ of the CUE to $P_{max}^c$;

S32. substituting the determined $P_m^c$ into C3, wherein the obtained expression is:

$$\frac{\frac{P_m^c g_{m,B}}{\gamma_{th}^c} - \sigma^2 - \sum_{\substack{n'=1 \\ n \neq n'}}^{N} a_{m,n'} P_{n'}^v g_{n',B}}{g_{n,B}} \geq P_n^v$$

S33. simplifying C4 by using the series theorem, wherein the obtained expression is:

$$\frac{P_n^v g_n}{P_m^c g_{m,n} + \sigma^2 + \sum_{\substack{n'=1 \\ n \neq n'}}^{N} r_{n',n} P_{n'}^v g_{n',n}} \geq \frac{\gamma_{th}^v}{\ln\left(\frac{1}{1-p_o}\right)}$$

S34. obtaining a value range of $P_n^v$ based on the expressions in S33 and S34, wherein $P_{n\_min}^v$ denotes a lower bound of the value range of $P_n^v$, $P_{n\_max}^v$ denotes an upper bound of the value range of $P_n^v$, and $P_{n\_min}^v$ and $P_{n\_max}^v$ are calculated by using the following formulas:

$$P_{n\_min}^v = \frac{\frac{\gamma_{th}^v}{\ln\left(\frac{1}{1-p_o}\right)} \times \left(P_m^c g_{m,n} + \sigma^2 + \sum_{\substack{n'=1 \\ n \neq n'}}^{N} r_{n',n} P_{n'}^v g_{n',n}\right)}{g_n}$$

$$P_{n\_max}^v = \min\left(\frac{\frac{P_m^c g_{m,B}}{\gamma_{th}^c} - \sigma^2 - \sum_{\substack{n'=1 \\ n \neq n'}}^{N} a_{m,n'} P_{n'}^v g_{n',B}}{g_{n,B}}, P_{max}^v\right);$$

and

S35. transforming the constraints C3, C4, C5, and C6 in the resource allocation model established in S2 into a constraint on the value range of $P_n^v$ based on a result of S34 to obtain the following optimized resource allocation model:

$$P1: \max \sum_{n=1}^{N} U_n$$

$$C1: U_n = \begin{cases} 1, \sum_{m=1}^{M} a_{m,n} > 0 \\ 0, \sum_{m=1}^{M} a_{m,n} = 0 \end{cases}$$

$$C2: \sum_{m=1}^{M} a_{m,n} \leq 1$$

$$C3: P_{n\_min}^v \leq P_n^v \leq P_{n\_min}^v, 1 \leq n \leq N.$$

5. The resource allocation method for IoV in a high-density in-vehicle communication environment according to claim 1, wherein the determining a transmit power and resource allocation methods for those of the VUEs in the coverage radius of the base station in S4 comprises:

S41. calculating value range $[P_{n\_min}^v, P_{n\_max}^v]$ of $P_n^v$ when one of the VUEs reuses resources of each CUE in the coverage radius of the base station;

S42. if it is calculated from S41 that $P_{n\_min}^v$ is less than $P_{n\_max}^v$, determining that the one of the VUEs can reuse uplink resources of a current CUE; otherwise, determining that the one of the VUEs cannot reuse resources of the current CUE;

S43. if it is determined in S42 that the one of the VUEs can reuse the resources of the current CUE, setting transmit power $P_n^v$ of the one of the VUEs to $P_{n\_max}^v$ calculated in S41, updating allocation matrix A and reuse matrix $\mathcal{R}$, and ending calculation for a current VUE; otherwise, continuing to traverse a next CUE until it is determined that resources of all CUEs in the coverage radius of the base station cannot be reused; and S44. repeating S41, S42, and S43 for all of the VUEs to obtain transmit power of all of the VUEs in the coverage radius of the base station and the resource allocation methods.

* * * * *